US012252255B2

(12) United States Patent
Whyte et al.

(10) Patent No.: US 12,252,255 B2
(45) Date of Patent: Mar. 18, 2025

(54) PRINTED OPTIMIZED TPMS STRUCTURE

(71) Applicant: B/E Aerospace, Inc., Winston-Salem, NC (US)

(72) Inventors: Nicole Sluder Whyte, Mesa, AZ (US); Nikhil Anthony Saldanha, Bangalore (IN); Chirag Krishnamurthy, Karnataka (IN); Travis K. Finlay, Winston-Salem, NC (US); Gururaja Nekkar, Bangalore (IN); Maxime Dempah, Atlanta, GA (US); Glenn A. Johnson, Rural Hall, NC (US); Mark B. Dowty, Rural Hall, NC (US); Samikshya Parida, Cuttack (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 139 days.

(21) Appl. No.: 18/122,019

(22) Filed: Mar. 15, 2023

(65) Prior Publication Data
US 2024/0158087 A1 May 16, 2024

(30) Foreign Application Priority Data
Nov. 11, 2022 (IN) .............................. 202211064621

(51) Int. Cl.
B64D 11/06 (2006.01)
(52) U.S. Cl.
CPC ................................ B64D 11/0647 (2014.12)
(58) Field of Classification Search
CPC ............ B64D 11/0647; B64D 11/0649; B64D 11/0619
See application file for complete search history.

(56) References Cited

U.S. PATENT DOCUMENTS

| 5,617,595 A * | 4/1997 | Landi .................... E01F 8/0076 428/116 |
| 10,457,175 B2 | 10/2019 | Lang et al. |
| 10,611,278 B2 | 4/2020 | Pardue et al. |
| 10,744,914 B2 | 8/2020 | Baek et al. |
| 10,913,535 B2 | 2/2021 | Udriste et al. |
| 11,156,241 B2 | 10/2021 | Eilers et al. |

(Continued)

FOREIGN PATENT DOCUMENTS

| EP | 1812260 A2 * | 8/2007 | .............. B60N 2/66 |
| WO | 2020128444 A1 | 6/2020 | |
| WO | 2021163161 A1 | 8/2021 | |

OTHER PUBLICATIONS

Extended European Search Report dated Apr. 2, 2024; European Application No. 23209247.8.

(Continued)

*Primary Examiner* — David E Allred
(74) *Attorney, Agent, or Firm* — Suiter Swantz IP

(57) ABSTRACT

A triply periodic minimal surface (TPMS) is described. The TPMS is adjustable and tunable depending on desired breathability, vibration performance, weight reduction, pressure distribution, and the like. The TPMS may be used in a cushion of a passenger seat. The cushion may be used for one or more locations of the passenger seat, including a head rest cushion, a back rest cushion, a seat pan cushion, and the like. the TPMS may include a cylindrical gyroid. Each of the cushions may include multiple of the cylindrical gyroids.

13 Claims, 20 Drawing Sheets

(56) References Cited

U.S. PATENT DOCUMENTS

| | | | |
|---|---|---|---|
| 2018/0043805 A1 | 2/2018 | Baek et al. | |
| 2019/0160989 A1 | 5/2019 | Pardue et al. | |
| 2022/0079280 A1* | 3/2022 | Laperriere | B22F 10/10 |
| 2022/0177138 A1 | 6/2022 | Hallford et al. | |
| 2022/0275845 A1 | 9/2022 | Kabaria et al. | |
| 2023/0080887 A1* | 3/2023 | Jawaid | A63B 71/1452/18 |
| 2023/0172314 A1* | 6/2023 | Ames | A43B 13/1436/45 |
| 2023/0281346 A1* | 9/2023 | Aubin | G06F 30/10 703/1 |
| 2023/0365262 A1* | 11/2023 | Whyte | B33Y 70/00 |
| 2023/0404216 A1* | 12/2023 | Schmid | A43B 17/14 |
| 2024/0001619 A1* | 1/2024 | McCutcheon | B22F 10/80 |
| 2024/0090687 A1* | 3/2024 | Micklos | A47G 9/0253 |
| 2024/0197033 A1* | 6/2024 | Bidal | A43B 13/181 |
| 2024/0245165 A1* | 7/2024 | Chen | A43D 999/00 |
| 2024/0251962 A1* | 8/2024 | Mostafa | A47C 27/144 |
| 2024/0365923 A1* | 11/2024 | Salari-Sharif | A43B 1/0009 |
| 2024/0369120 A1* | 11/2024 | Kloster | F16F 9/003 |
| 2024/0382413 A1* | 11/2024 | DeSimone | B33Y 10/00 |

OTHER PUBLICATIONS

Szatkiewicz et al., The Influence of the Structure Parameters on the Mechanical Properties of Cylindrically Mapped Gyroid TPMS Fabricated by Selective Laser Melting with 316L Stainless Steel Powder. Materials. 2022; 15(12):4352. https://doi.org/10.3390/ma15124352.

Wang, et al., (2019). Numerical and experimental studies on compressive behavior of Gyroid lattice cylindrical shells. Materials & Design. 186. 108340. 10.1016/j.matdes.2019.108340.

* cited by examiner

302

302

400a

400b

400d

500a

500b

700

300

PRINTED OPTIMIZED TPMS STRUCTURE

CROSS-REFERENCE TO RELATED APPLICATIONS

The present application claims the benefit of India Provisional Patent Application 202211064621, filed Nov. 11, 2022, titled "PRINTED OPTIMIZED TPMS STRUCTURE", naming Nicole S. Whyte et al. as inventors, with a Digital Access Service (DAS) code of DD82, which is incorporated herein by reference in the entirety.

TECHNICAL FIELD

The present invention generally relates to seating and more specifically to support structures for the cushions of the seats.

BACKGROUND

Passenger seats may include one or more cushions. The cushions are predominantly manufactured using polyurethane (PU) foams. Undesirably, polyurethane foams lack breathability. These foams are not very breathable often having poor ventilation. The poor ventilation may cause the cushions to trap odors within the aircraft. The foams may also have poor heat transfer capacity. Both the poor breathability and poor heat transfer capacity may lead to aircraft passenger displeasure. For example, the passenger may be in contact with the aircraft seating assembly for prolonged time periods during which time the passenger may smell the odor or may experience discomfort due to temperature. Additionally, the polyurethane foams may be disposed of in a landfill. The polyurethane foam cushions may offer limited vibration absorption. Finally, the polyurethane foam cushions may have limited variation and optimization in terms of rigidity and firmness. Therefore, it would be advantageous to provide a device, system, and method that cures the shortcomings described above.

SUMMARY

A passenger seat is described, in accordance with one or more embodiments of the present disclosure. In some embodiments, the passenger seat includes a seat back. In some embodiments, the passenger seat includes a seat pan. In some embodiments, the passenger seat includes a cushion. In some embodiments, the cushion includes one or more lattice structures. In some embodiments, the one or more lattice structures each comprise a triply periodic minimal surface. In some embodiments, the triply periodic minimal surface is formed of a plurality of unit cells. In some embodiments, the plurality of unit cells are periodic in cylindrical coordinates.

A cushion is described, in accordance with one or more embodiments of the present disclosure. In some embodiments, the cushion includes one or more lattice structures. In some embodiments, the one or more lattice structures each comprise a triply periodic minimal surface. In some embodiments, the triply periodic minimal surface is formed of a plurality of unit cells. In some embodiments, the plurality of unit cells are periodic in cylindrical coordinates. In some embodiments, the triply periodic minimal surface comprises a cylindrical gyroid. In some embodiments, the one or more lattice structures each comprise a polymer. In some embodiments, the polymer is an elastomer. In some embodiments, the plurality of unit cells are defined by a radius dimension, an angular dimension, a height dimension, a radius repetition, an angular repetition, a height repetition, an inner radius, and a wall thickness. In some embodiments, the wall thickness is at least 1 mm. In some embodiments, the cylindrical gyroid is open cell. In some embodiments, the one or more lattice structures each comprise an indentation load deflection of between 20 and 80 pounds.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1A:
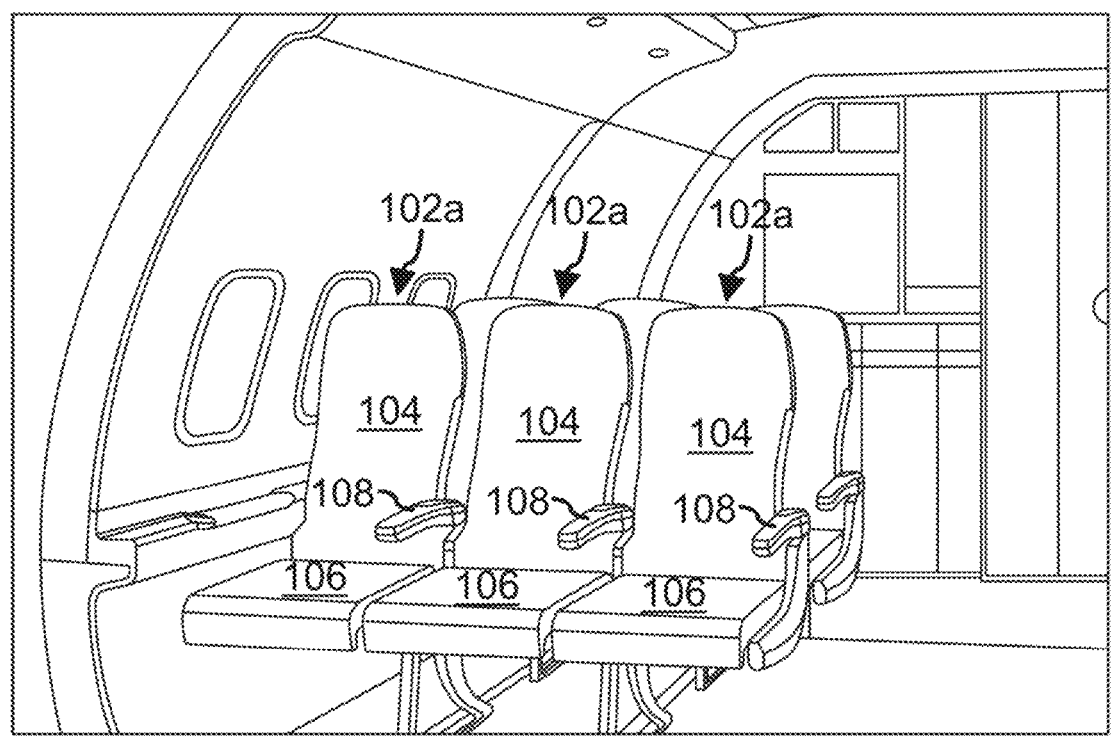
FIGS. 1A-1C depicts a perspective view of an aircraft including passenger seats, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Lattice structures are generally described in U.S. Pat. No. 10,913,535B2, titled "Cushion assembly with elastomeric lattice insert", filed on Jan. 21, 2019; U.S. Pat. No. 10,611,278B2, titled "Lattices for use in aircraft seat assemblies", filed on Nov. 29, 2017; and U.S. Pat. No. 11,156,241, titled "Diffuser", filed on Mar. 25, 2020; which are each incorporated herein by reference in the entirety.

Reference will now be made in detail to the subject matter disclosed, which is illustrated in the accompanying drawings. Embodiments of the present disclosure are generally directed to cushions which include triply periodic minimal surfaces (TPMS). The TPMS may enable sustainable cushions made from biobased, recyclable, compostable, and/or biodegradable material. The TPMS may also enable cushions with advanced cooling & breathability through adjustable void spaces. The TPMS may also enable cushions with vibration damping, pressure distribution, stiffness, and/or rigidity. The TPMS may also enable weight reduction for the cushions through adjustable void spaces.

Figure 1B:
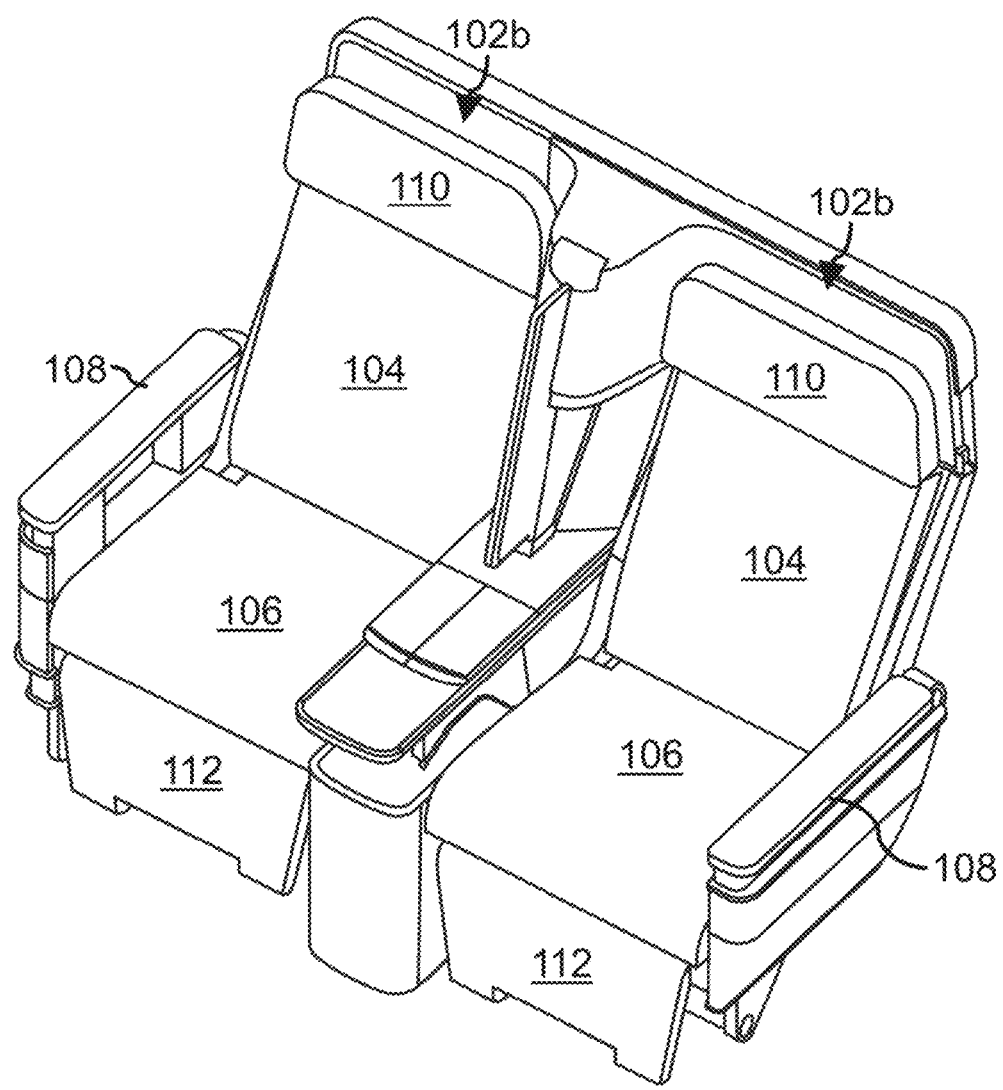
Figure 1C:
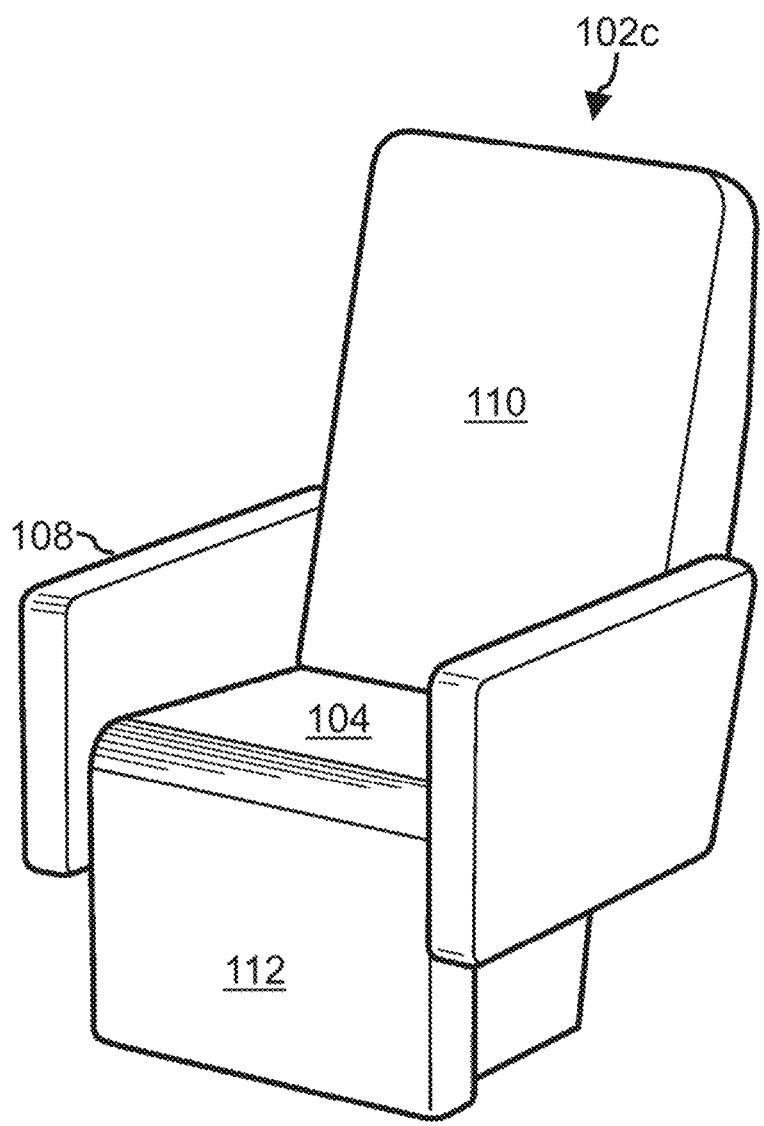

Referring now to FIGS. 1A-1C, an aircraft 100 that includes a passenger seat 102 is described, in accordance with one or more embodiments of the present disclosure. For example, the passenger seat 102 may include, but is not limited to, an economy-class passenger seat, a business class passenger seat, a first-class passenger seat, a cabin attendant passenger seat, and the like. FIG. 1A depicts an example of a passenger seat 102a. FIG. 1B depicts an example of a passenger seat 102b. FIG. 1C depicts an example of a passenger seat 102c. The passenger seats 102a-102c are merely illustrative of the various embodiments of the present disclosure and are not intended to be limiting.

The passenger seat 102 may include a seat back 104 and a seat pan 106. The passenger seat 102 is coupled to a floor (e.g., by a track) for providing structural support to the seat pan 106 and the seat back 104. In embodiments, the seat back 104 and the seat pan 106 may be separate structures and/or may include one or more shared components. For example, the seat back 104 and the seat pan 106 can have a shared cushion or covering. The seat back 104 may also be configured to move relative to the seat pan 106. For example, the seat back 104 can be configured to transition between upright and reclining positions. In embodiments, the seat pan 106 can also be actuated such that the passenger seat 102 may be configurable between an upright position and a bed position (i.e., a lie-flat position), although this is not intended to be a limitation of the present disclosure. The passenger seat 102 may also include one or more arm rests 108. The arm rests 108 may be pivotally mounted to the passenger seat 102 by a pivot joint or another kinematic coupling. In embodiments, the passenger seat 102 may include a head rest 110. The head rest 110 may be coupled to the seat back 104. In embodiments, the passenger seat 102 may include a foot rest 112. The foot rest 112 may be coupled to the seat pan 106.

In embodiments, one or more of the seat back 104, seat pan 106, arm rest 108, head rest 110, and/or the foot rest 112 includes a cushion. It is further contemplated that a partition, a monument, an ottoman, and the like within the aircraft 100 may include the cushion. In this regard, the cushion may be incorporated into one or more of the seat back 104, seat pan 106, arm rest 108, head rest 110, foot rest 112, the partition, the monument, or the ottoman of the aircraft 100. Furthermore, each of the various seat back 104, seat pan 106, arm rest 108, head rest 110, foot rest 112, partition, monument, and ottoman may include the cushion.

In embodiments, the cushion may include a cover. The cover may be configured to fit over at least a portion of the cushion, such as one or more structural portions (e.g., lattice structures) of the cushions. For example, the cover may be configured to wrap around or otherwise enclose the structure portions of the cushion. In embodiments, the cushion may include one or more lattice structures. The lattice structure may be disposed in a load-bearing region of the cushion. The lattice structure may then bear a load of the cushion.

Figure 2A:
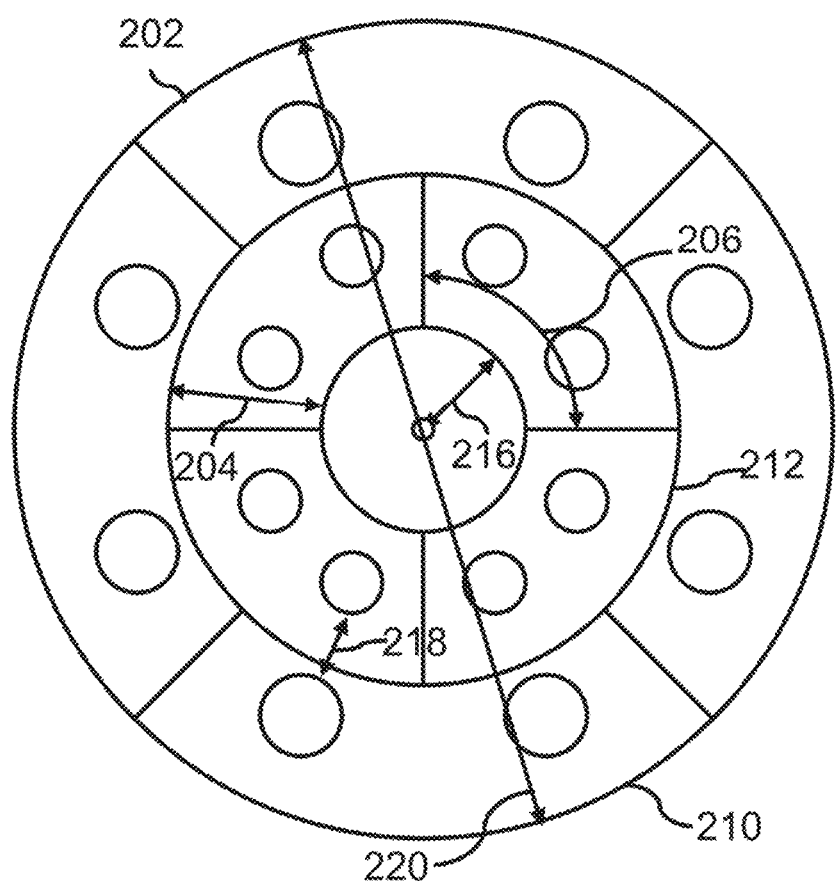
FIGS. 2A-2B depicts unit cell repetition of a cylindrical lattice structure, in accordance with one or more embodiments of the present disclosure.
Figure 2A:
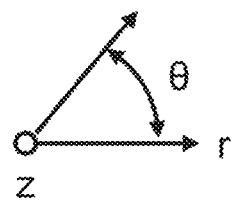
Figure 2B:
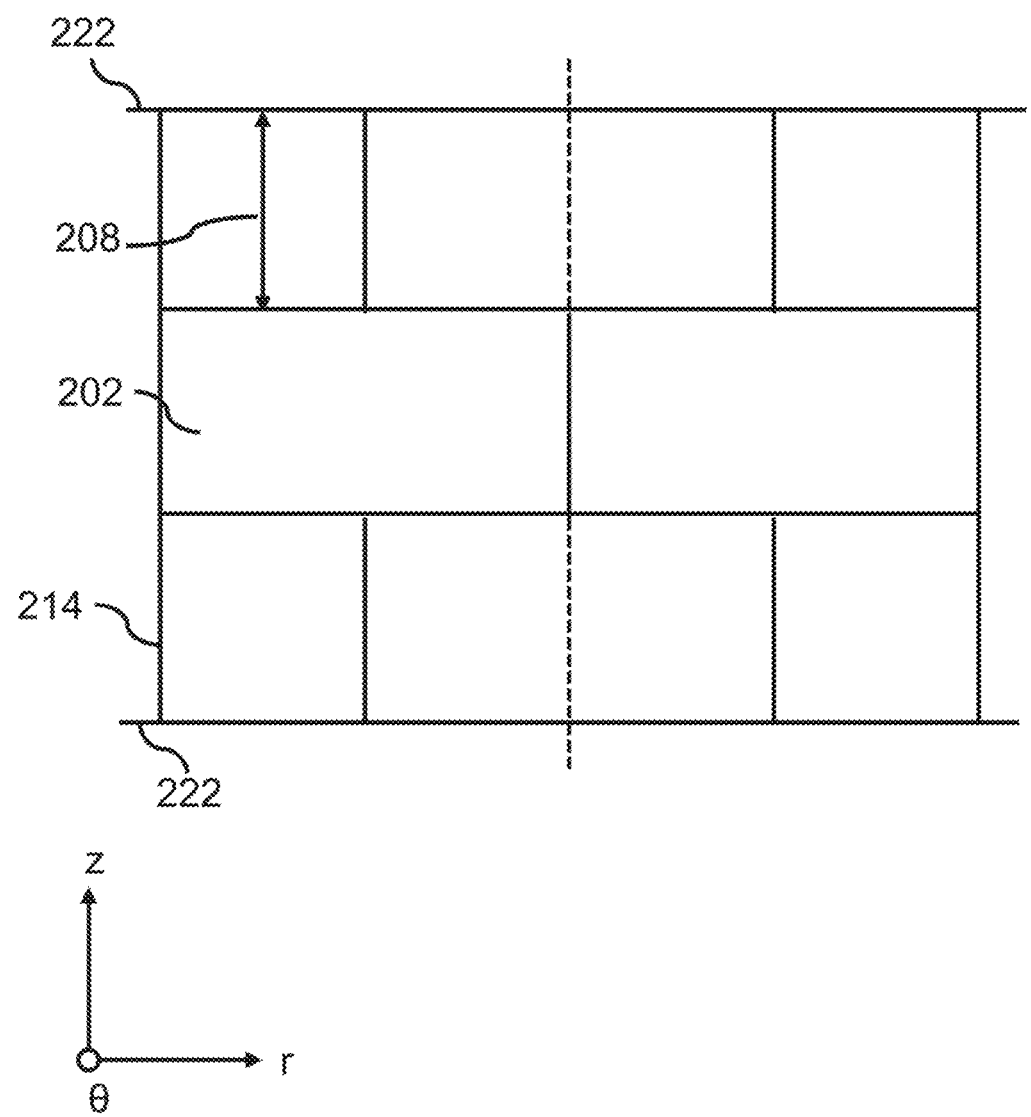
Figure 3A:
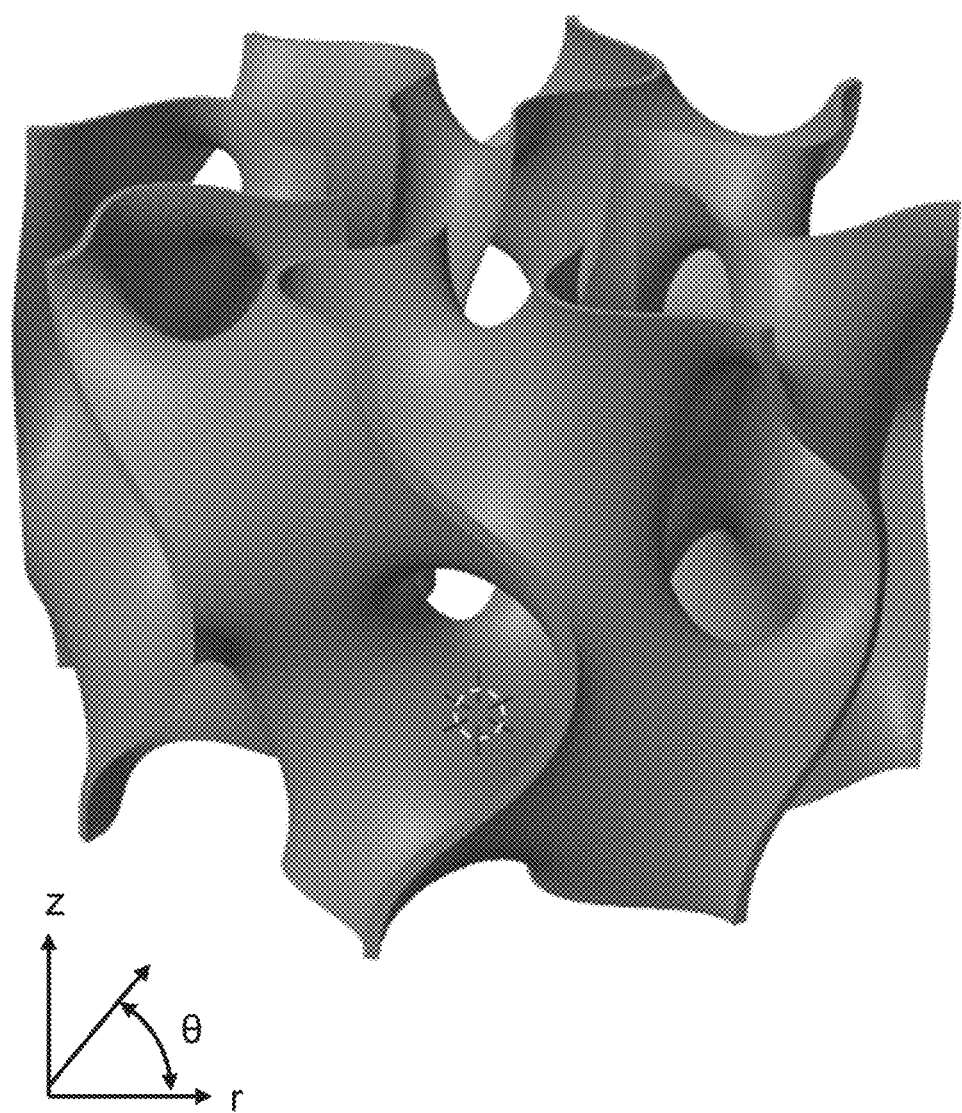
FIG. 3A depicts a gray-scale drawing of a cylindrical gyroid, in accordance with one or more embodiments of the present disclosure.
Figure 3B:
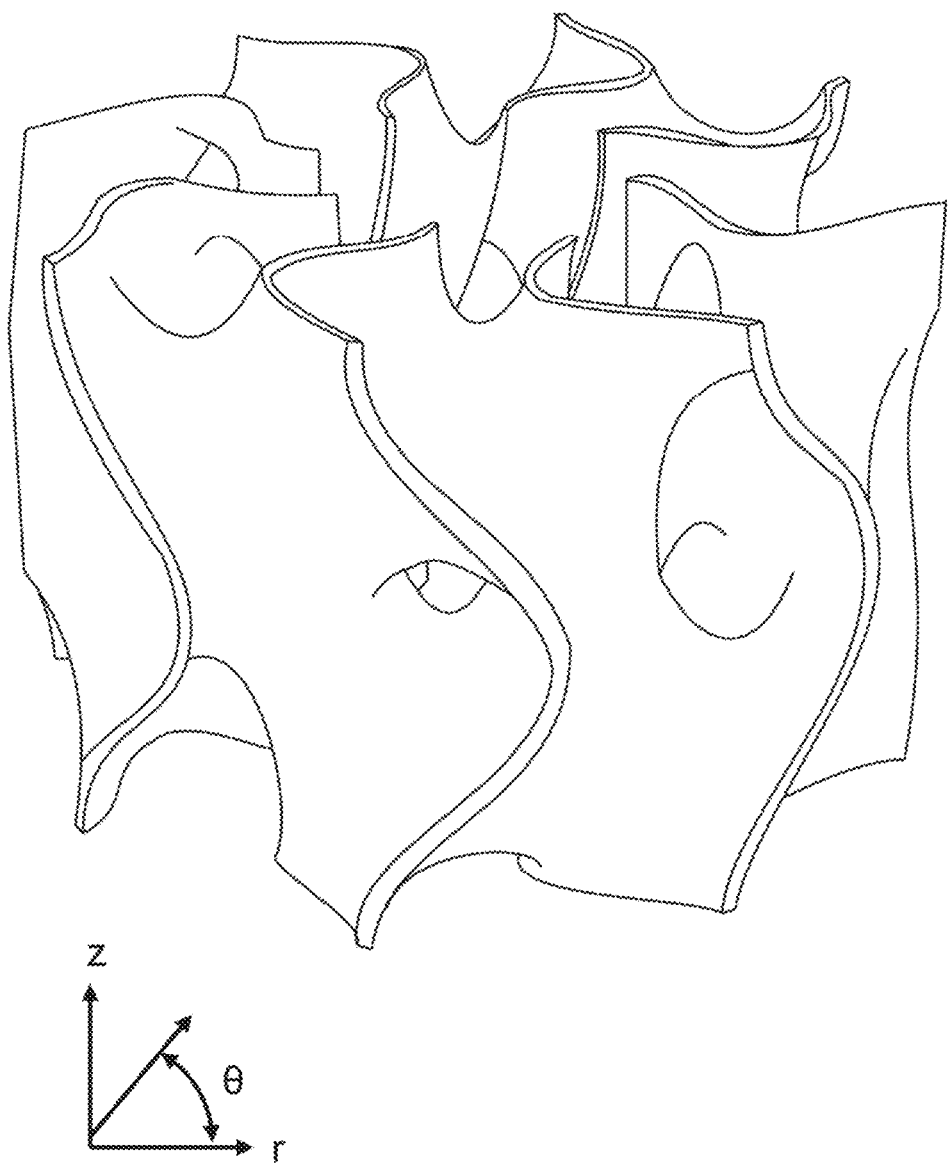
FIG. 3B depicts a black and white line drawing of the cylindrical gyroid of 3A, in accordance with one or more embodiments of the present disclosure.
Figure 3C:
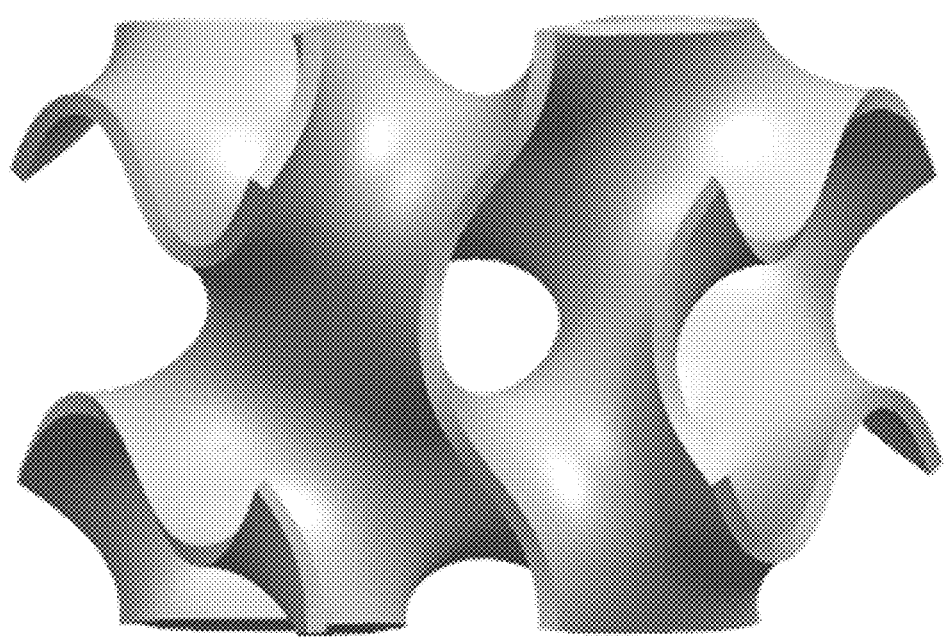
FIG. 3C depicts a gray-scale drawing of unit cell of a cylindrical gyroid, in accordance with one or more embodiments of the present disclosure.
Figure 3D:
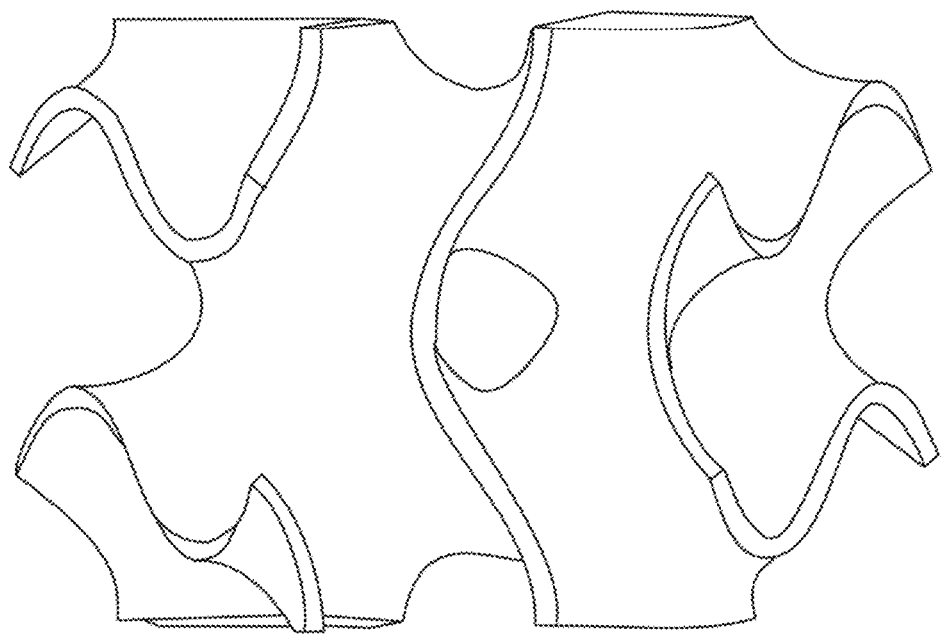
FIG. 3D depicts a black and white line drawing of the unit cell of 3C, in accordance with one or more embodiments of the present disclosure.

Referring now to FIG. 2, a lattice structure 200 is described, in accordance with one or more embodiments of the present disclosure. The lattice structure 200 may be a three-dimensional lattice structure. A lattice may refer to a geometric pattern. The geometric pattern may repeat across the lattice. In embodiments, the lattice structure 200 may by a lattice cylindrical shell (LCS) structure. Lattice cylindrical shell may refer to lattice structure 200 which is cylindrical. The lattice structure 200 may be defined relative to a cylindrical coordinate frame. Points in the cylindrical coordinate frame may be defined relative by a radius (r), an angle ($\theta$), and a height (z). The radius (r) and the angle ($\theta$) may be defined relative to the axis of the lattice structure 200. The axis of the lattice structure 200 may refer to an imaginary line through the center of the lattice structure 200 which is perpendicular to the faces of the lattice structure 200.

In embodiments, the lattice structure 200 may be a minimal surface. Minimal surface may refer to a surface that locally minimizes the area of the surface. The minimal surface may be minimized according to one or more definitions. In embodiments, the minimal surface may be a triply periodic minimal surface (TPMS). Triply periodic minimal surfaces may refer to minimal surfaces which are periodic in three dimensions (R3). For example, the triply periodic minimal surface may be periodic in the cylindrical coordinate system. The triply periodic minimal surfaces may be free from intersections. The triply periodic minimal surface may be formed of the unit cells 202. The triply periodic minimal surface may be adjustable and tunable depending on breathability, vibration performance, weight reduction, and/or pressure distribution. The triply periodic minimal surface may include an open cell structure. The triply periodic minimal surface may be breathable by the open cell structure.

In embodiments, the triply periodic minimal surface may include, but are not limited to, gyroid, schwarz minimal surfaces, P-type minimal surfaces, and the like. Much of the present disclosure is directed to the triply periodic minimal surface being a cylindrical gyroid, although this is not intended to be limiting. Different triply periodic minimal surface may be used to match the performance of the cylindrical gyroid.

In embodiments, lattice structure 200 comprises unit cells 202. Unit cell 202 may refer to a repeating unit forming the lattice structure 200 in the geometric pattern. The lattice structure 200 may thus be formed of multiple of the unit cells. In embodiments, the unit cells 202 may be periodic in the cylindrical coordinates. Periodic in the cylindrical coordinates may mean the unit cells 202 occur at predetermined internals in the cylindrical coordinates. The lattice structure 200 may be defined by the one or more parameters. The parameters may determine the periodicity of the unit cells 202 in the cylindrical coordinates. The parameters may include, but are not limited to, unit cell dimensions (e.g., radius dimension 204, an angular dimension 206, a height dimension 208), unit cell repetitions (e.g., radius repetitions 210, angular repetitions 212, height repetitions 214), inner radius 216, wall thickness 218, outer diameter 220, and the like. In embodiments, the unit cell dimensions, the unit cell repetitions, the inner radius 216, the wall thickness 218, and/or the outer diameter 220 may impact a stiffness and a weight of the lattice structure 200 and similarly the cushion.

The unit cell dimensions may determine the dimension of the unit cell 202 in the respective coordinate of the cylindrical coordinates. For example, the radius dimension 204 may determine the dimension of the unit cell 202 in the radius (r). The radius dimension 204 may also be referred to as Ur or Ux. By way of another example, the angular dimension 206 may determine the dimension of the unit cell 202 in the angle (θ). The angular dimension 206 may also be referred to as Uθ or Uy. By way of another example, the height dimension 208 may determine the dimension of the unit cell 202 in the height (z). The height dimension 208 may also be referred to as Uz. In embodiments, the radius dimension 204, angular dimension 206, and/or the height dimension 208 may be proportional to the stiffness and the weight. In this regard, increasing the radius dimension 204, the angular dimension 206, and/or the height dimension 208 may increase the stiffness and the weight.

Similarly, the unit cell repetitions may determine the number of repetitions of the unit cell 202 in the respective coordinate of the cylindrical coordinates. For example, the radius repetitions 210 may determine the number of repetitions of the unit cell 202 in the radius (r). The radius repetitions 210 may also be referred to as Rrep or Xrep. By way of another example, the angular repetitions 212 may determine the number of repetitions of the unit cell 202 in the angle (θ). The angular repetitions 212 may also be referred to as peripheral repetitions, θrep, or Yrep. By way of another example, the height repetitions 214 may determine the number of repetitions of the unit cell 202 in the height (z). The height repetitions 214 may also be referred to as Zrep. In embodiments, the radius repetitions 210, angular repetitions 212, and/or the height repetitions 214 may be proportional to the stiffness and the weight. In the example depicted, the radius repetition 210 is two of the unit cells 202, the angular repetition 212 is four of the unit cells 202, and the height repetition 214 of three of the unit cells 202. In this regard, the example depicted includes twenty-four of the unit cells 202. The specific number of the repetitions is not intended to be limiting and is merely exemplary. The number of repetitions may be varied to vary the number of the unit cells 202 in the lattice structure 200.

In embodiments, the lattice structure 200 may or may not include an inner radius 216. The inner radius 216 may define the location of the innermost of the unit cells 202 from the radius of the cylinder. The inner radius 216 may thus define a cylindrical hole through the lattice structure 200. The inner radius 216 may also be referred to as Rin.

In embodiments, the wall thickness 218 may define a minimum thickness for the walls of the lattice structure 200. For example, the lattice structure 200 may define one or more holes in each of the unit shells. In embodiments, the lattice structure 200 defines two holes for each of the unit cells 202 when viewed from the top. The wall thickness 218 may be maintained between each of the holes. The wall thickness 218 may also be maintained between the holes and the inner surface defined by the inner radius 216. The wall thickness 218 may also be maintained between the holes and the outer diameter 220 of the lattice structure 200. Decreasing the wall thickness 218 may create more wide spaces or holes within the lattice structure. In embodiments, the wall thickness 218 includes a minimum value. Maintaining the wall thickness 218 above the minimum value may be advantageous to maintain the ability to fabricate the lattice structure 200 (e.g., by printing and/or by molding). The wall thickness 218 may also be referred to as a T.

In embodiments, the lattice structure 200 may define one or more holes or void spaces based on the geometric pattern of the unit cells 202. The lattice structure 200 may be considered an open cell lattice by the one or more holes and/or the inner radius 216. Open cell may refer to the lattice being not encapsulated by the walls of the lattice structure 200. Air may flow through the open cell with minimal restriction. The holes may be advantageous to provide breathability or ventilation to the cushion. In embodiments, the holes may be adjusted to achieve a desired flow coefficient for the lattice structure 200. The flow coefficient may indicate the ability to allow airflow. The flow coefficient may be adjusted to allow for better heat transfer.

The number of unit repetitions and the unit cell dimensions in each direction can be adjusted to obtain desired performance characteristics. For example, the void spaces may be adjusted to achieve breathability, cooling, vibration damping, stiffness, rigidity, weight, and the like. The vibration damping may be based on a loss factor and a young's modulus of the lattice structure 200. The pressure distribution and/or stiffness or rigidity may be tuned to improve passenger comfort. The void spaces may be adjusted for weight reduction. The lattice structure 200 may then be used in cabin interior for seating, any cushion, and energy absorption locations.

In embodiments, the lattice structure 200 may include a stiffness. The stiffness may be measured in indentation load deflection (ILD). Indentation load deflection (ILD) may indicate a number of pounds of pressure needed to indent a cushion by 25%. Indentation load deflection (ILD) may also be referred to as indentation force deflection (IFD) or as a compression profile. The design parameters of the lattice structure 200 may control the Indentation Load Deflection (ILD) of between 20 and 80 pounds. In embodiments, the design parameters of the lattice structure 200 may be selected to achieve a desired value for the Indentation Load Deflection (ILD). For example, the lattice structure may include an Indentation Load Deflection (ILD) of between 20 and 80 pounds.

In embodiments, the lattice structure may have a uniform or a non-uniform Indentation load deflection (ILD) along one or more directions. For example, the Indentation load deflection of between 20 to 80 pounds may be along the axis of the cylinder. The lattice structure may or may not include the Indentation load deflection of between 20 to 80 pounds along other directions of compression (e.g., along the radius). It is contemplated the indentation load deflection along the radius may be less than along the axis. In embodiments, the axis of the lattice structure 200 may be aligned within the cushion. For example, the axis of the lattice structure 200 may be perpendicular to the cover 222 of the cushion. The lattice structure 200 may then deform along the axis when weight is added to the cushion.

The lattice structure 200 may be made from a variety of materials including but not limited to a polymer. In embodiments, the polymer may be an elastomer. The elastomer may include an elastomeric property. Elastomeric may refer to a synthetic material having an elastic property. In this regard, the lattice structure 200 may be elastically deformed (e.g., when supporting weight on the cushion). The lattice structure 200 may then return to an original shape when the weight is removed from the cushion. The polymer may include any type of elastomer material, such as, but not limited to, a thermoplastic elastomer (TPE). In embodiments, the polymer may include a Shore A hardness. The Shore A hardness may be selected to achieve a suitable resistance to indentation. For example, the polymer may include a Shore A hardness between 40A and 95A. For instance, the Shore A hardness may between 80A and 90 A. One reason for selecting the materials may be to achieve a desired stiffness. The shore hardness may affect the stiffness of the lattice structure 200. In embodiments, the polymer may include a material density. For example, the polymer may include a material density of between 0.44 g/cm$^3$ and 1.38 g/cm$^3$. For instance, the polymer may include a material density of between 1.18 g/cm$^3$ and 1.31 g/cm$^3$. In embodiments, the polymer may be flame retardant. Flame retardant may refer to polymers that resist degradation when subject to fires.

In embodiments, the polymer may come in one or more forms, such as, but not limited to, powder (e.g., selective laser sintering (SLS) powder, multi jet fusion (MJF) powder, etc.), pellets (e.g., fused granule fabrication (FGF) pellets), liquid (e.g., stereolithography (SLA) liquid), and the like. The lattice structure 200 may then be fabricated from the polymer using one or more techniques, such as, but not limited to, an additive manufacturing process (e.g., process (e.g., selective laser sintering, photopolymerization (e.g., stereolithography), material extrusion, binder jetting, extrusion, powder bed fusion, directed energy deposition, etc.) and/or an injection molding process (e.g., co-injection molding).

In embodiments, the polymer material may be selected to include one or more characteristics such as, but not limited to, biobased, recyclable, biodegradable, compostable, and the like. Biobased may refer to polymers derived from renewable resources (replenished by natural procedures at rates comparable or faster than their rate of compositions). Recyclable may refer to polymers capable of being reprocessed to be formed into a new item. Biodegradable may refer to polymers capable of breaking down by bacterial decomposition to produce one or more byproducts. Compostable may refer to polymers capable of underdoing biological decomposition in a compost site as part of an available program such that plastic is not visually distinguishable and breaks down to carbon dioxide, water, inorganic compounds, and biomass at rate consistent with known compostable materials. Using the polymers with the biobased, recyclable, biodegradable, and/or compostable characteristics may enable the cushion be sustainably sourced or provide minimal impacts on landfills. It is further contemplated that the polymer is not limited to having any of the biobased, recyclable, biodegradable, and/or compostable characteristics.

In one example, the polymer material may include a TPE TC8FTN polymer, 80A36G1N U polymer, GDH-B1FA polymer, and the like to achieve any of the described properties.

Referring now to FIGS. 3A-3D, a cylindrical gyroid 300 and unit cell 302 is described, in accordance with one or more embodiments of the present disclosure. In embodiments, the triply periodic minimal surface may be a gyroid. The gyroid may be an infinitely connected triply periodic minimal surface that contains no straight lines or planar symmetries. In embodiments, the gyroid is the cylindrical gyroid 300. The cylindrical gyroid 300 may be periodic in cylindrical coordinates. The cylindrical gyroid 300 may be embedded. Embedded may refer to a property in which the surface of the gyroid does not self-intersect. The cylindrical gyroid 300 may be defined by the one or more parameters. For example, the cylindrical gyroid may include the unit cells 302. The discussion of the unit cells 202 is incorporated herein by reference to the unit cells 302. The unit cells 302 may be defined by the unit cell dimensions (e.g., radius dimension 204, an angular dimension 206, a height dimension 208), unit cell repetitions (e.g., radius repetitions 210, angular repetitions 212, height repetitions 214), inner radius 216, wall thickness 218, outer diameter 220, and the like. The cylindrical gyroid 300 may be defined by one or more mathematical equations based various dimensions described.

A number of exemplary ranges are now provided for the cylindrical gyroid 300. The exemplary ranges are provided for example. Various modifications may be made to the ranges to achieve a desired Indentation load deflection for the cylindrical gyroid 300. In embodiments, the values are selected such that the cylindrical gyroid includes an Indentation load deflection of between 20 and 80 pounds. As may be understood, the values for the radius dimension 204, angular dimension 206, height dimension 208), radius repetitions 210, angular repetitions 212, height repetitions 214, inner radius 216, wall thickness 218, and outer diameter 220 are exemplary and are not intended to be limiting.

The radius dimension 204 (Ux) may include a range of values. For example, the radius dimension 204 may include a range of between 0.75 inches and 1.25 inches. In embodiments, the radius dimension 204 may be fixed at 1 inch. The radius dimension 204 may be proportional to the outer diameter of the cylindrical gyroid. In this regard, if the radius dimension 204 increases, then the outer diameter of the cylindrical gyroid may increase a proportional amount. The radius dimension 204 may also be inversely proportional to the stiffness of the cylindrical gyroid. In this regard, increases to the radius dimension 204 (and similarly the outer diameter of the cylindrical gyroid 300) may cause a decrease to the stiffness.

The angular dimension 206 (Uy) may include a range of values. In some embodiments, the angular dimension 206 may be determined based on the radius dimension 204, the inner radius 216, and/or the outer diameter of the cylindrical gyroid 300.

The height dimension 208 (Uz) may include a range of values. For example, the height dimension 208 may include a range between 1 inch and 2 inches. The height dimension 208 may be inversely varied with the height repetitions 214.

The radius repetitions 210 (Xrep) may include a value of one or greater. For example, radius repetitions 210 may include a range between 1 and 2. In embodiments, the radius repetitions 210 may be fixed at 1. The radius repetitions 210 may increase the outer diameter of the cylindrical gyroid 300 and similarly decrease the stiffness of the cylindrical gyroid.

The angular repetitions 212 (Yrep) may include a value of one or greater. For example, angular repetitions 212 may include a range between four and eight, such as between four and six. In embodiments, the angular repetitions 212 is six. In embodiments, the angular repetitions 212 may be proportional to the stiffness.

The height repetitions 214 (Zrep) may include a value of one or greater. For example, height repetitions 214 may include a range between one and two. In embodiments, the height repetitions 214 is one. In embodiments, the height repetitions 214 may be inversely varied with the height dimension 208. For example, the height dimension 208 and the height repetitions 214 may be selected to achieve a height for the cylindrical gyroid 300 based on an existing cushion height.

The inner radius 216 (Rin) may include a range of values. For example, inner radius 216 may include a range greater than 0 inches. In embodiments, the inner radius 216 may be between 0.5 inches and 1 inch.

The wall thickness 218 (T) may include a range of values. For example, wall thickness 218 may include a range greater than 0 inches. In embodiments, the wall thickness 218 is always greater than 1 mm.

The outer diameter 220 may include a range of values. For example, outer diameter 220 may include between 2.5 inches and 5 inches.

Referring now to FIGS. 4A-4E, a top view of a cylindrical gyroid 400 is described, in accordance with one or more embodiments of the present disclosure. In the examples depicted, the various parameters are changed to illustrate the effect on the cylindrical gyroid 400. As may be understood, the various parameters are exemplary and are not intended to be limiting.

Figure 4A:
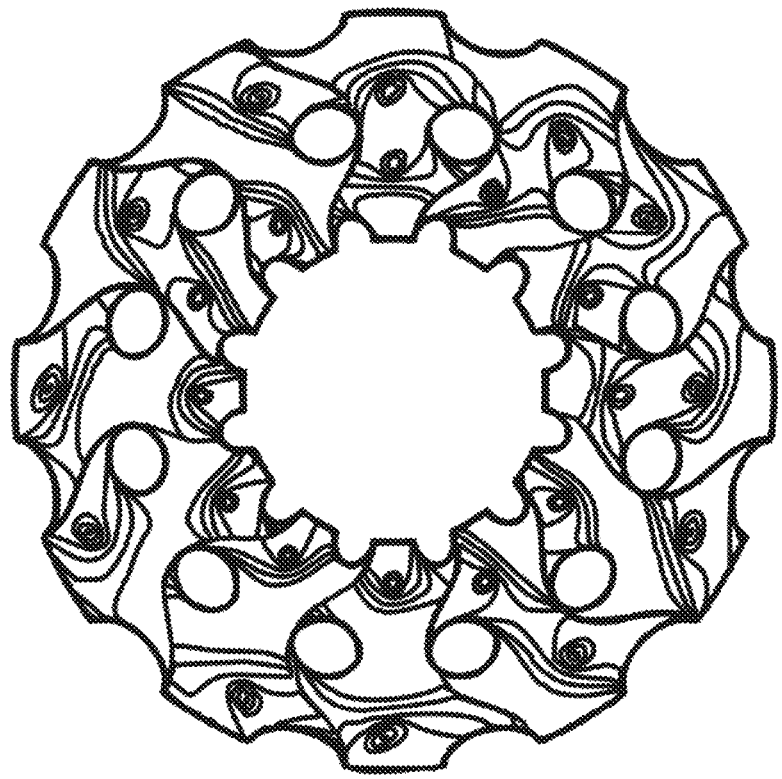
FIGS. 4A-4E depicts a top view of a cylindrical gyroid, in accordance with one or more embodiments of the present disclosure.
Figure 4A:
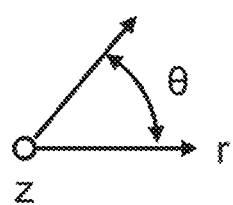

FIG. 4A depicts a cylindrical gyroid 400a. The cylindrical gyroid 400a includes the following parameters: radius dimension 204 (Ux) of 0.75 inches, inner radius 216 (Rin) of 0.5 inches, outer diameter 220 of 2.5 inches, radius repetitions 210 (Xrep) of 1, and angular repetitions 212 (Yrep) of 6.

Figure 4B:
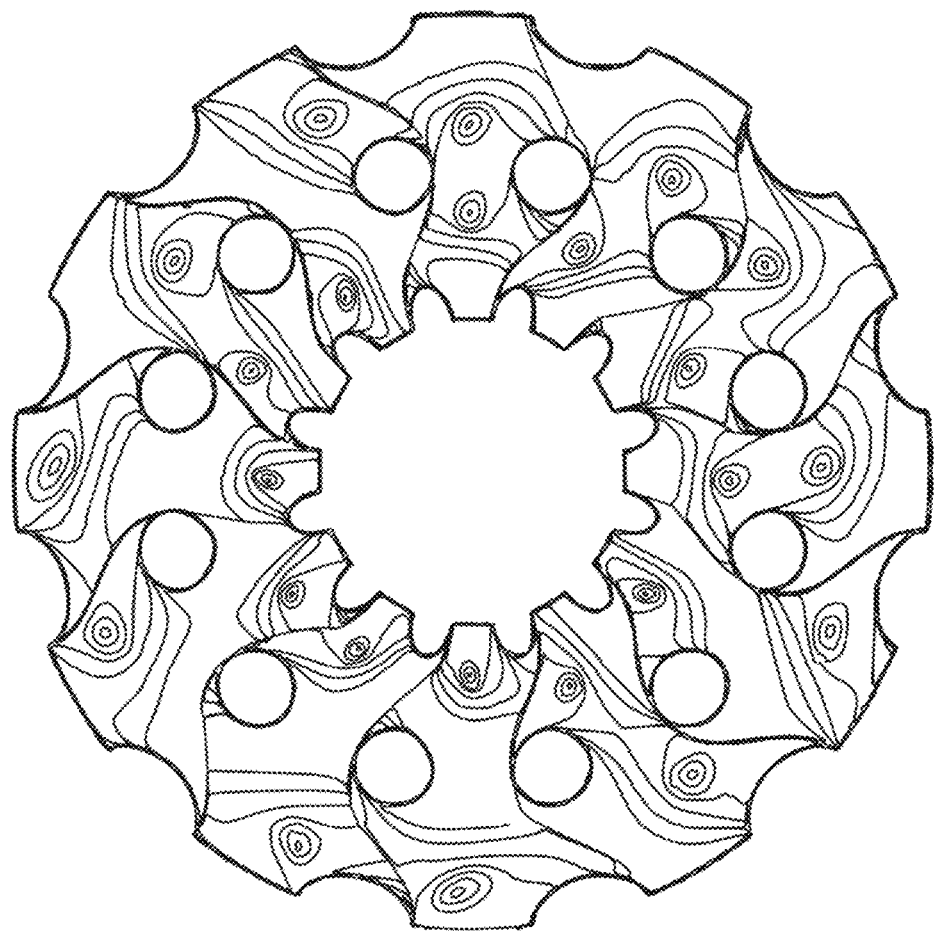
Figure 4B:
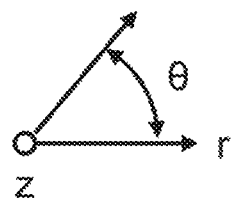

FIG. 4B depicts a cylindrical gyroid 400b. The cylindrical gyroid 400b includes the following parameters: radius dimension 204 (Ux) of 1-inch, inner radius 216 (Rin) of 0.5 inches, outer diameter 220 of 3 inches, radius repetitions 210 (Xrep) of 1, and angular repetitions 212 (Yrep) of 6.

Figure 4C:
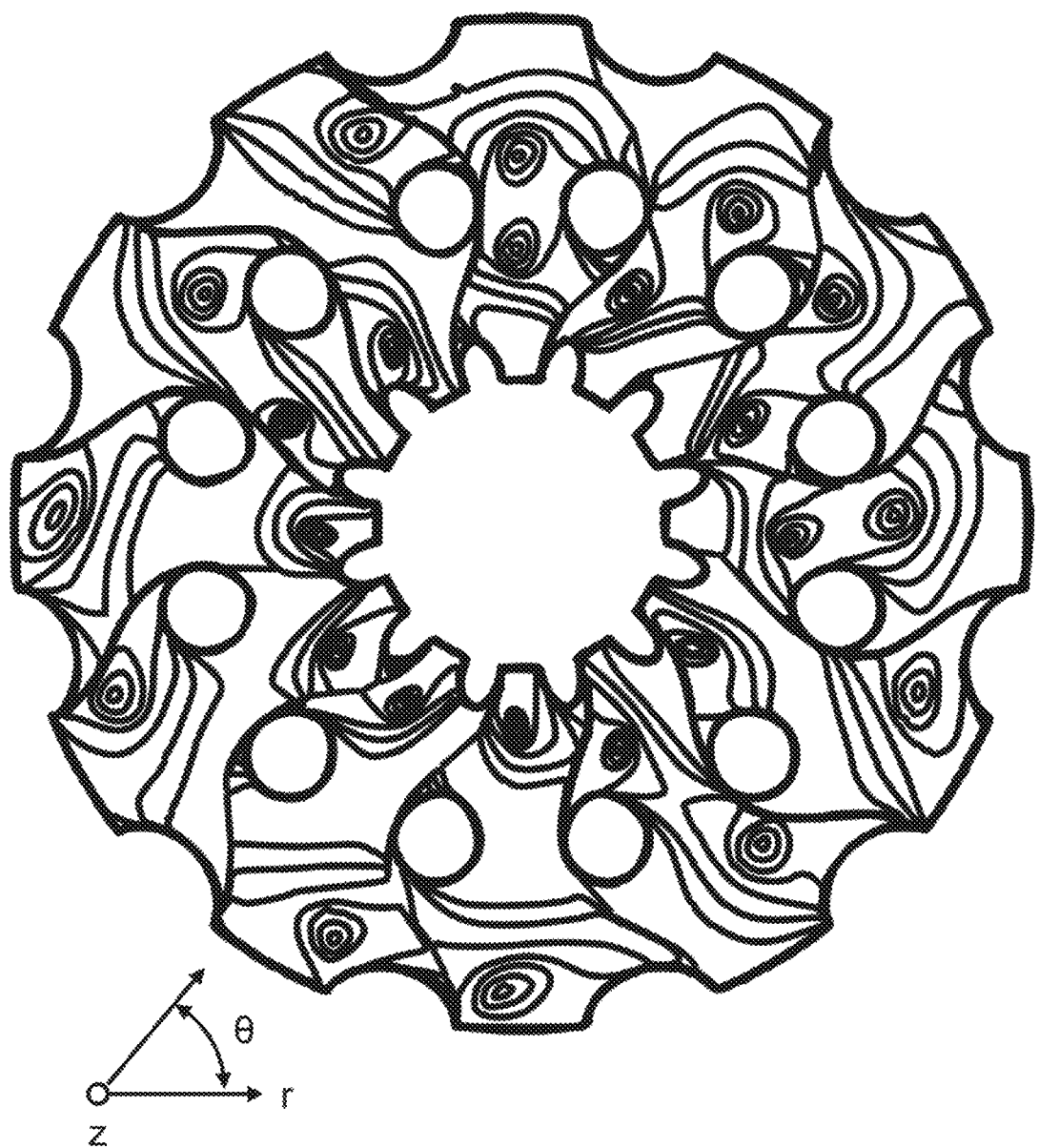

FIG. 4C depicts a cylindrical gyroid 400c. The cylindrical gyroid 400c includes the following parameters: radius dimension 204 (Ux) of 1.25 inches, inner radius 216 (Rin) of 0.5 inches, outer diameter 220 of 3.5 inches, radius repetitions 210 (Xrep) of 1, and angular repetitions 212 (Yrep) of 6.

Figure 4D:
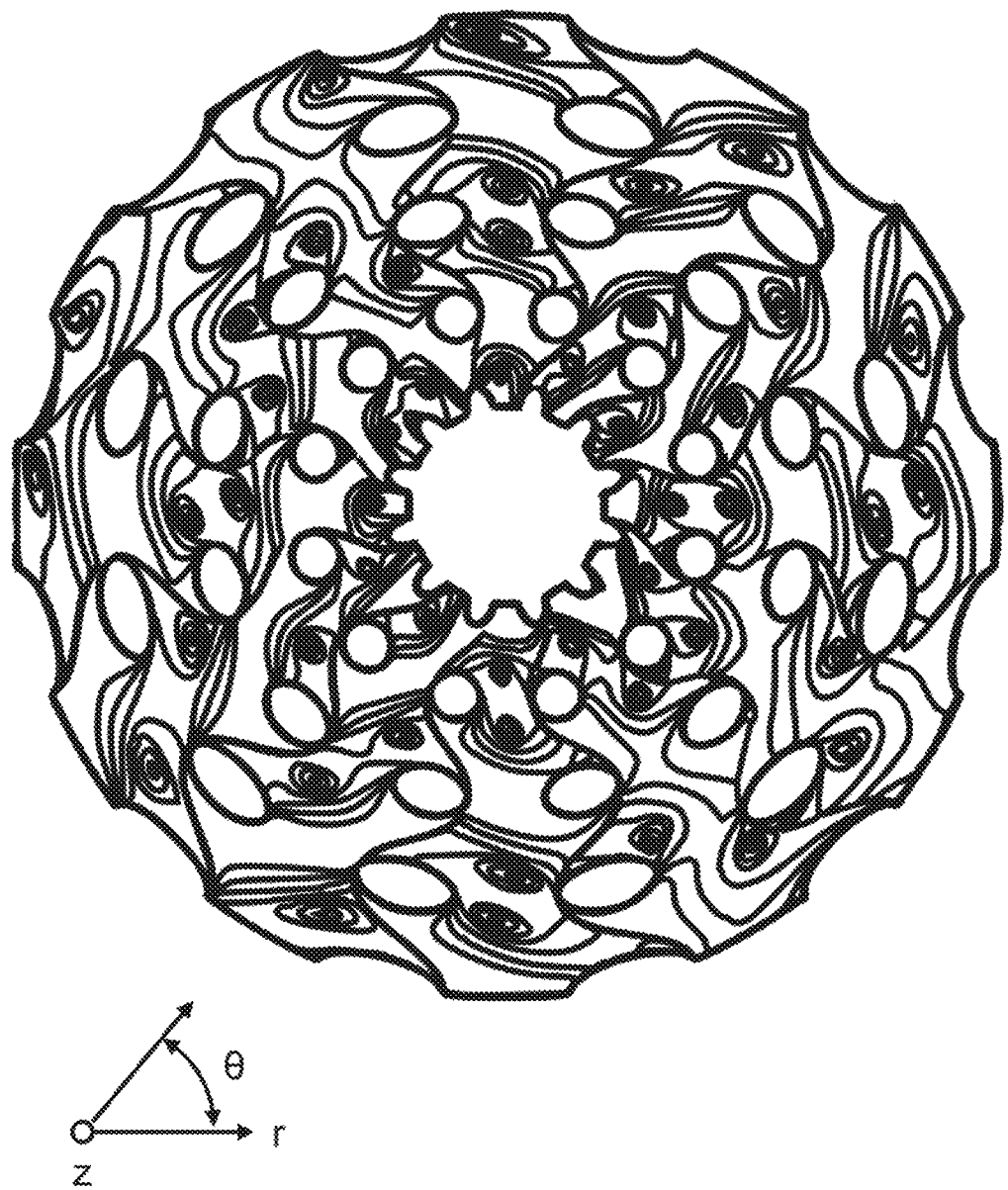

FIG. 4D depicts a cylindrical gyroid 400d. The cylindrical gyroid 400d includes the following parameters: radius dimension 204 (Ux) of 1-inch, inner radius 216 (Rin) of 0.5 inches, outer diameter 220 of 5 inches, radius repetitions 210 (Xrep) of 2, and angular repetitions 212 (Yrep) of 6.

Figure 4E:
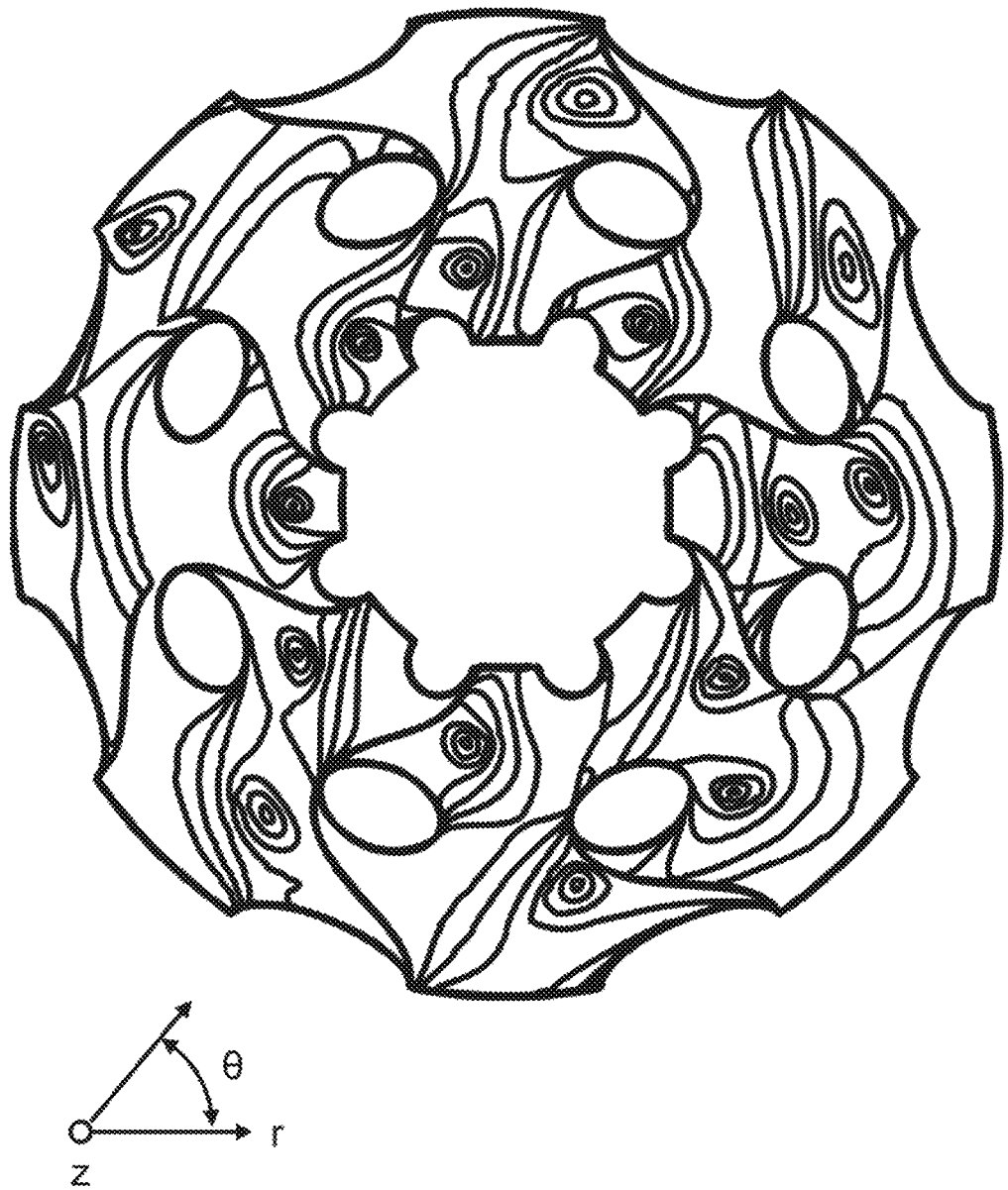

FIG. 4E depicts a cylindrical gyroid 400e. The cylindrical gyroid 300e includes the following parameters: radius dimension 204 (Ux) of 1-inch, inner radius 216 (Rin) of 0.5 inches, outer diameter 220 of 3 inches, radius repetitions 210 (Xrep) of 1, and angular repetitions 212 (Yrep) of 4.

Referring now to FIGS. 5A-5E, a side view of a cylindrical gyroid 500 is described, in accordance with one or more embodiments of the present disclosure. In the examples depicted, the various parameters are changed to illustrate the effect on the cylindrical gyroid 500. As may be understood, the various parameters are exemplary and are not intended to be limiting.

Figure 5A:
FIGS. 5A-5B depicts a side view of a cylindrical gyroid, in accordance with one or more embodiments of the present disclosure.
Figure 5A:
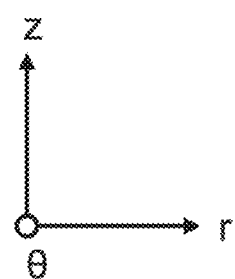

FIG. 5A depicts a cylindrical gyroid 500a. The cylindrical gyroid 500a includes the following parameters: height dimension 208 (Uz) of 1-inch, height repetitions 214 (Zrep) of 2, and a height of 2 inches.

Figure 5B:
Figure 5B:
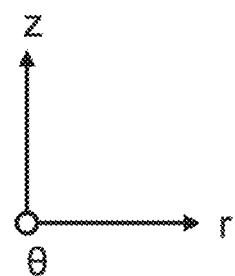

FIG. 5B depicts a cylindrical gyroid 500b. The cylindrical gyroid 500b includes the following parameters: height dimension 208 (Uz) of 2 inches, height repetitions 214 (Zrep) of 1, and a height of 2 inches.

Figure 6:
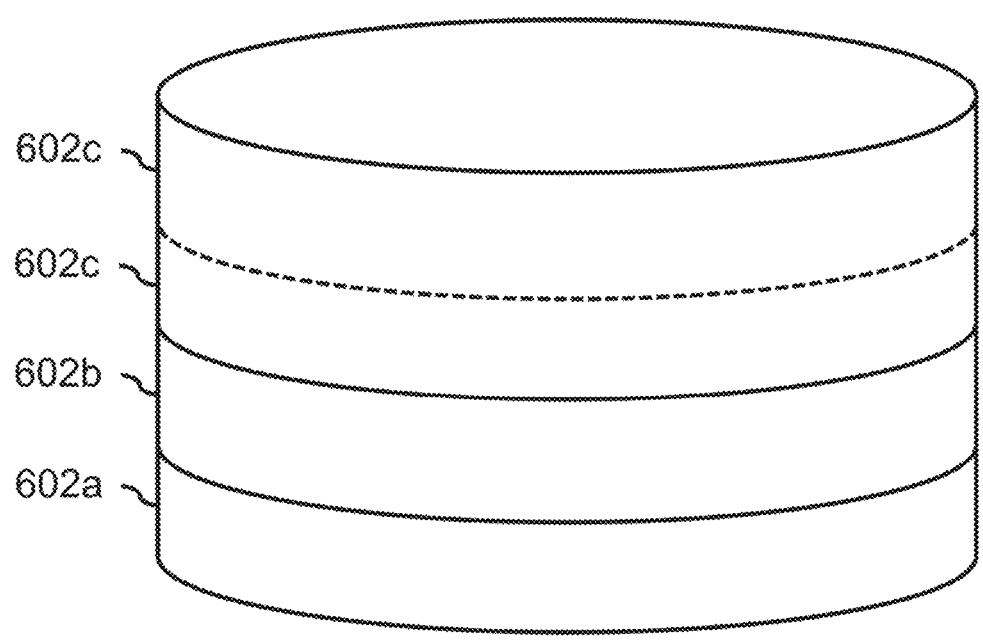
FIG. 6 depicts a simplified perspective view of a lattice structure including layers formed of multiple materials, in accordance with one or more embodiments of the present disclosure.
Figure 6:
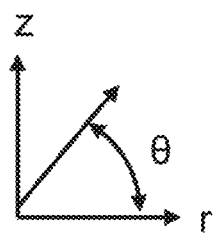

Referring now to FIG. 6, a lattice structure 600 is described, in accordance with one or more embodiments of the present disclosure. The lattice structure 600 may include at least two layers 602 of the unit cells in the z-direction or along the axis. The lattice structures may comprise at least two of the layers 602 when the height repetition is at least two. The layers 602 may each comprise the polymer material, as previously described. In embodiments, the lattice structure 600 may comprise multiple materials. In embodiments, the polymer material for the layers 602 is different across the layers. The lattice structure 600 may include layers of the in the z-direction (e.g., along the axis) which are formed of different polymer material. Each layer may include a separate material. In this regard, the layers may include separate properties, such as different stiffness values. The layers may be fabricated to include the separate material using any technique, such as, but not limited to, additive manufacturing with multiple materials or co-injection molding with multiple materials. The materials may be bonded together by a chemical bond or by printing one material on top of another material. In embodiments, the layers may include a transition zone of materials. The transition zone may refer to a mixing of the materials from one layer with a mixing of materials from another layer. The height of the transition zone may be based on the technique used to fabricate the different materials in the layers.

As depicted, the lattice structure 600 includes four of the height repetitions and three layers. The lattice structure 600 includes a first layer 602a with one repetition of the unit cells, a second layer 602b with one repetition of the unit cells, and a third layer 602c with two repetitions of the unit cells. In this example, the first layer may be a first polymer, the second material may be a second polymer, and the third layer may be a third polymer. The first polymer, the second polymer, and the third polymer each may be different than the respective polymers. The order of the stiffnesses may be selected to blend different materials and get different performances in the single unit, such that the three layers are not intended to be limiting.

Figure 7:
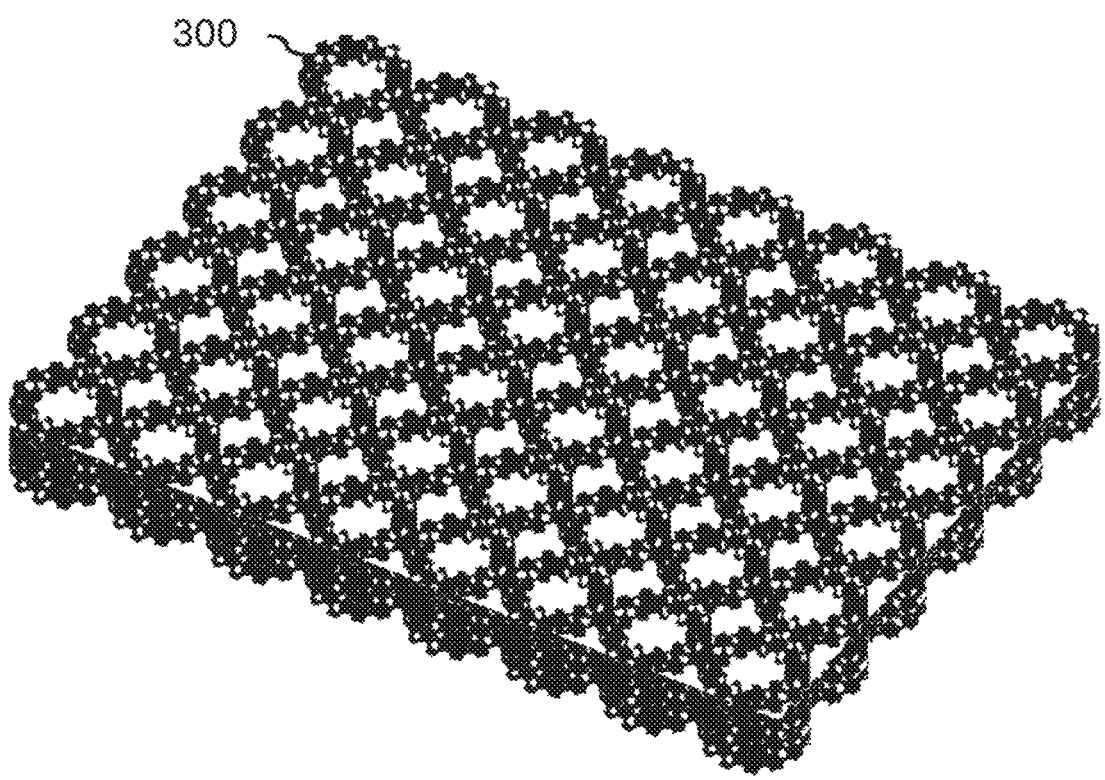
FIG. 7 depicts a perspective view of a layout of a cushion including uniform cylindrical gyroids, in accordance with one or more embodiments of the present disclosure.
Figure 8:
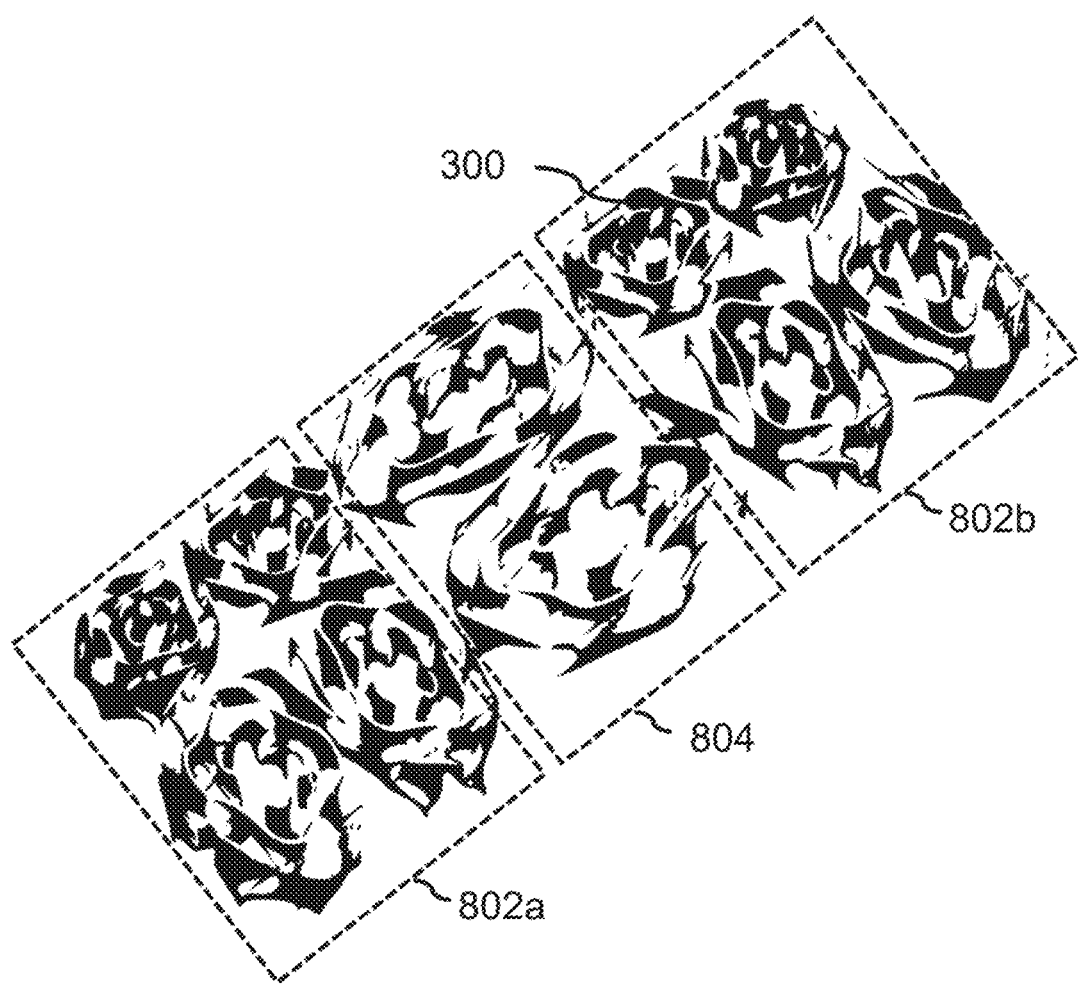
FIG. 8 depicts a perspective view of a layout of a head rest cushion including cylindrical gyroids, in accordance with one or more embodiments of the present disclosure.
Figure 9:
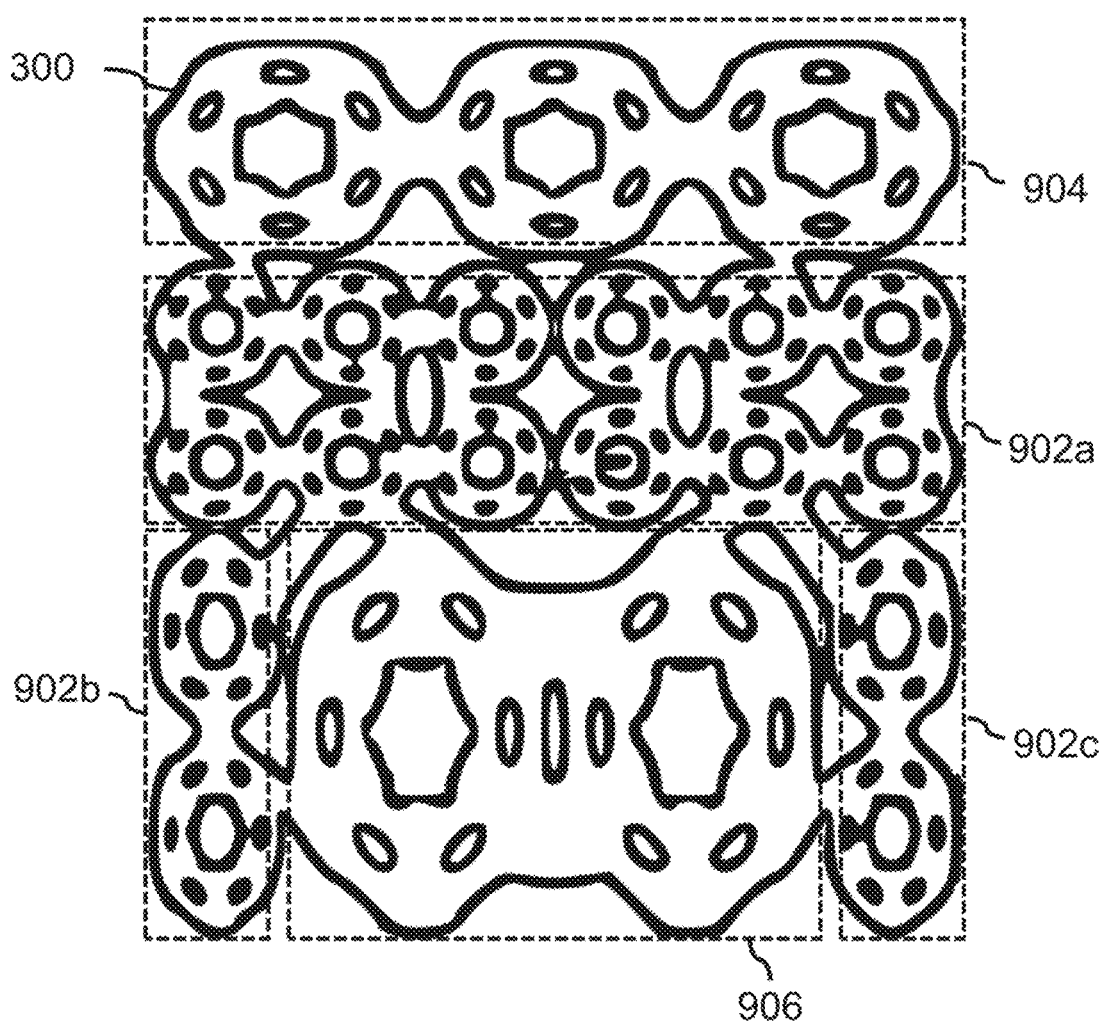
FIG. 9 depicts a top view of a layout of a seat rest cushion including cylindrical gyroids, in accordance with one or more embodiments of the present disclosure.

Referring generally to FIGS. 7-9, the cushions of the passenger seat 102 may include one or more of the lattice structures 200 in a layout. The layout for the lattice structures 200 may be selected to achieve a desired stiffness for the cushion. As depicted, the lattice structures are the cylindrical gyroid 300, although this is not intended to be limiting. As may be understood, the layout is not limited to the number of lattice structures described. The layout may be adjusted based on the width and length of the cushion. Similarly, the layout may be adjusted based on the parameters of the lattice structure.

As used herein, packing density may refer to having more material in a same volume. The packing density may be determined based on the outer diameter 220 of the cylindrical gyroids 300. Cylindrical gyroids with a smaller diameter may include a larger packing density, because more of the cylindrical gyroids may be located in the same volume. More packing density in turn offers more stiffness and similarly more indentation load deflection. Thus, the packing density may be increased where there is a need for higher reaction force or higher stiffness by adjusting the parameters of the cylindrical gyroids and increasing the number of cylindrical gyroids in the volume of the cushion. In particular, the packing density may be adjusted to normalize the pressure throughout the cushion based on the expected location of a load on the cushion. The packing density of the cushions may be designed based on the expected pressure distribution. For example, the packing density of the cylindrical gyroids may be increased where the skull of a passenger rests on the head rest cushion. By way of another example, the packing density of the cylindrical gyroids may be increased where the seat of a passenger rests on a seat pan cushion.

The packing density may also increase the density of the cushion, and similarly the weight. Thus, using the cylindrical gyroid with the same outer diameter may achieve a uniform packing density and indentation load deflection, but may also achieve undesirable weight characteristics. In embodiments, the cushion includes a combination of cylindrical gyroids with a large outer diameter and cylindrical gyroids with a small outer diameter. The cylindrical gyroids with the smaller outer diameter may be located in a higher-pressure region of the cushion. The use of the smaller cylindrical gyroids may enable sufficient support in the higher-pressure regions. Similarly, cylindrical gyroids with a larger outer diameter may be located in a lower pressure region of the cushion. The use of the larger cylindrical gyroids may enable a weight reduction for the cushion. Thus, the cushion may be optimized to achieve both a desired indentation load deflection across the cushion together with minimizing the weight. For instance, the location and packing density for the cylindrical gyroids may be determined by extracting pressure mapping data for each type of cushion and then optimizing with respect to the pressure mapping data.

Referring now to FIG. 7, a layout 700 of one or more cushions of the passenger seat 102 is described, in accordance with one or more embodiments of the present disclosure. The layout 700 may include a uniform lattice structure within the cushion. The cushion may include a plurality of the lattice structures 200. In the example depicted, the layout 700 includes five-by-eight of the cylindrical gyroids, for a total of forty of the cylindrical gyroids. Each of the unit cells within the lattice structure may include the same parameters. In this regard, the plurality of lattice structures may each comprise a first outer diameter.

Referring now to FIG. 8, a layout 800 of one or more cushions of the passenger seat 102 is described, in accordance with one or more embodiments of the present disclosure. In embodiments, the layout 800 may be for head rest cushion of the head rest 110. The cushion may include a plurality of the lattice structures 200. The plurality of lattice structures may comprise a first set of lattice structures 802 and a second set of lattice structures 804. The first set of lattice structures 802 may each comprise a first outer diameter. The second set of lattice structures 804 may each comprise a second outer diameter. The first outer diameter may be less than the second outer diameter. For example, the outer diameter of the second set of lattice structures 804 may be twice the outer diameter of the first set of lattice structures 802.

In embodiments, the indentation load deflection for the first set of lattice structures 802 may be greater than the indentation load deflection for the second set of lattice structures 804. The indentation load deflection for the first set of lattice structures 802 may be greater than the indentation load deflection for the second set of lattice structures 804 due to the first set of lattice structures 802 having a higher packing density than the second set of lattice structures 804.

As depicted, the first set of lattice structures 802 comprises a first subset 802a and a second subset 802b. The second set of lattice structures 804 may be disposed between the first subset 802a and the second subset 802b. The relative arrangements of the second set of lattice structures 804 between the first subset 802a and the second subset 802b together with the relative indentation load deflection for the first set of lattice structures 802 being greater than the indentation load deflection for the second set of lattice structures 804 may allow the head rest cushion to provide relatively less support for the rear surface of the skull of the passenger, together with greater support for the neck of the passenger. The second set of lattice structures 804 may be configured to cradle the head of the passenger and the first subset 802a may then cradle the neck of the passenger.

In the example depicted, the first subset 802a includes a two-by-two arrangement of the cylindrical gyroids and the second subset 802b includes a two-by-two arrangement of the cylindrical gyroids for a total of eight cylindrical gyroids. In the example depicted, the second set of lattice structures 804 includes a two-by-one arrangement of the cylindrical gyroids.

Referring now to FIG. 9A, a layout 900 of one or more cushions of the passenger seat 102 is described, in accordance with one or more embodiments of the present disclosure. In embodiments, the layout 900 may be for seat pan cushion of the seat pan 106. The cushion may include a plurality of the lattice structures 200. The plurality of lattice structures may comprise a first set of lattice structures 902, a second set of lattice structures 904, and a third set of lattice structures. The first set of lattice structures 902 may each comprise a first outer diameter. The second set of lattice structures 904 may each comprise a second outer diameter. The third set of lattice structures 906 may each comprise a third outer diameter. The first outer diameter may be less than the second outer diameter. For example, the outer diameter of the second set of lattice structures 804 may be twice the outer diameter of the first set of lattice structures 902. The third set of lattice structures 906 each comprise a third outer diameter. The second outer diameter may be less than the third outer diameter.

In embodiments, the indentation load deflection for the first set of lattice structures 902 may be greater than the indentation load deflection for the second set of lattice structures 904. The indentation load deflection for the first set of lattice structures 902 may be greater than the indentation load deflection for the second set of lattice structures 904 due to the first set of lattice structures 902 having a higher packing density than the second set of lattice structures 904. In embodiments, the indentation load deflection for the second set of lattice structures 904 may be greater than the indentation load deflection for the third set of lattice structures 906. The indentation load deflection for the second set of lattice structures 904 may be greater than the indentation load deflection for the third set of lattice structures 906 due to the second set of lattice structures 904 having a higher packing density than the third set of lattice structures 906.

In embodiments, the first set of lattice structures 902 comprises a first subset 902a. The first subset 902a may be arranged between the second set of lattice structures 904 and the third set of lattice structures 906. In this regard, the first subset 902a may provide a region which is relatively stiffer between the second set of lattice structures 904 and the third set of lattice structures 906. In embodiments, the first set of lattice structures 902 comprises a second subset 902b and a third subset 902c. The third set of lattice structures 906 may be disposed between the second subset 902b and the third subset 902c. In this regard, third set of lattice structures 906 may provide a relatively less stiff region between the second subset 902b and the third subset.

In the example depicted, the first set of lattice structures 902 comprises a total of fourteen of the cylindrical gyroids. The first subset 902a includes a six-by-two arrangement of the cylindrical gyroids. The second subset 902b and the third subset 902c each include a one-by-two arrangement of the cylindrical gyroids. The second set of lattice structures 904 comprises a three-by-one arrangement of the cylindrical gyroids. The third set of lattice structures 904 comprises a two-by-one arrangement of the cylindrical gyroids.

Referring generally again to FIGS. 1A-9.

In embodiments, the passenger seat 102 may include an air conditioning system. The air conditioning system may be in thermal communication with the cushion and operable for delivering conditioned air through the lattice. The air conditioning system may vent air to the bottom of the cushion. The air may be cooled air or heated air. In some applications, conditioned air may be supplied through the lattice to enhance comfort for an aircraft passenger. Advantageously, the lattice may include breathability (e.g., open cell), allowing the conditioned air to flow from the air conditioning system to the passenger. The air conditioning system may then locally create climate control for the passenger. Thus, the passenger seat 102 may be considered to include localized cooling or heating. In embodiments, the cushion may include a 13% temperature reduction in the temperature rise (e.g., delta T) due to the voids.

It is noted that where the passenger seat 102 is installed within the aircraft 100, the passenger seat 102 may be configured in accordance with aviation guidelines and/or standards put forth by, but not limited to: the Federal Aviation Administration (FAA), the European Aviation Safety Agency (EASA), or any other flight certification agency or organization; the American National Standards Institute (ANSI) or any other standards setting organization or company; and the like.

Although much of the present disclosure is directed to the passenger seat 102 being installed within the aircraft 100 or aircraft cabin, it is noted herein the passenger seat 102 may be installed within any number of environments. For example, the environment may include any type of vehicle known in the art. For instance, the vehicle may be any air, land, or water-based personal equipment or vehicle; any air, land, or water-based commercial equipment or vehicle; any air, land, or water-based military equipment or vehicle known in the art. By way of another example, the environment may include a commercial or industrial establishment (e.g., a home or a business).

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A passenger seat comprising:
   a seat back;
   a seat pan; and
   a cushion comprising:
      one or more lattice structures, wherein the one or more lattice structures each comprise a triply periodic minimal surface, wherein the triply periodic minimal surface is formed of a plurality of unit cells, wherein the plurality of unit cells are periodic in cylindrical coordinates, wherein the triply periodic minimal surface comprises a cylindrical gyroid, wherein the one or more lattice structures each comprise a polymer, wherein the polymer is an elastomer, wherein the plurality of unit cells are defined by a radius dimension, an angular dimension, a height dimension, a radius repetition, an angular repetition, a height repetition, an inner radius, and a wall thickness, wherein the one or more lattice structures each comprise an indentation load deflection of between 20 and 80 pounds inclusive, wherein the one or more lattice structures is a plurality of lattice structures, wherein the plurality of lattice structures comprises a first set of lattice structures and a second set of lattice structures, wherein the first set of lattice structures each comprise a first outer diameter, wherein the second set of lattice structures each comprise a second outer diameter, wherein the first outer diameter is less than the second outer diameter, wherein the indentation load deflection for the first set of lattice structures is greater than the indentation load deflection for the second set of lattice structures.

2. The passenger seat of claim 1, wherein the wall thickness is at least 1 mm.

3. The passenger seat of claim 1, wherein the cylindrical gyroid is open cell.

4. The passenger seat of claim 1, comprising a head rest, wherein the cushion is a head rest cushion of the head rest, wherein the first set of lattice structures comprises a first subset and a second subset, wherein the second set of lattice structures are disposed between the first subset and the second subset.

5. The passenger seat of claim 1, wherein the cushion is a seat pan cushion of the seat pan, wherein the plurality of lattice structures comprises a third set of lattice structures, wherein the third set of lattice structures each comprise a third outer diameter, wherein the second outer diameter is less than the third outer diameter, wherein the indentation load deflection for the second set of lattice structures is greater than the indentation load deflection for the third set of lattice structures.

6. The passenger seat of claim 5, wherein the first set of lattice structures comprises a first subset, wherein the first subset are disposed between the second set of lattice structures and the third set of lattice structures.

7. The passenger seat of claim 6, wherein the first set of lattice structures comprises a second subset and a third subset, wherein the third set of lattice structures are disposed between the second subset and the third subset.

8. The passenger seat of claim 2, wherein the angular repetition is between four and six inclusive.

9. The passenger seat of claim 8, wherein the height repetition is between one and two inclusive.

10. The passenger seat of claim 9, wherein the radius dimension is between 0.75 inches and 1.25 inches inclusive.

11. The passenger seat of claim 10, wherein an outer diameter of the is between 2.5 inches and 3.5 inches inclusive.

12. The passenger seat of claim 1, wherein the polymer is a first polymer, wherein the height repetition is at least two, wherein the one or more lattice structures each comprise at least a first layer and a second layer, wherein the first layer comprises the first polymer, wherein the second layer comprises a second polymer, wherein the first polymer is different than the second polymer.

13. The passenger seat of claim 1, wherein the triply periodic minimal surface comprises one of a schwarz minimal surfaces or a P-type surfaces.

* * * * *